United States Patent
Wecke et al.

(10) Patent No.: US 6,717,087 B1
(45) Date of Patent: Apr. 6, 2004

(54) MONITORING DEVICE FOR THE SEALING WEB WIDTH

(75) Inventors: Wolfgang Wecke, Wolfen (DE); Siegbert Feja, Wolfen (DE); Eckhard Hoffmann, Wolfen (DE)

(73) Assignee: Bayer Bitterfeld GmbH, Greppin (DE)

( * ) Notice: Subject to any disclaimer, the term of this patent is extended or adjusted under 35 U.S.C. 154(b) by 0 days.

(21) Appl. No.: 09/605,190

(22) Filed: Jun. 28, 2000

(30) Foreign Application Priority Data

Jul. 8, 1999 (DE) .......................................... 199 31 710

(51) Int. Cl.⁷ .............................. B07C 5/00; B07C 5/34
(52) U.S. Cl. ....................................... 209/579; 209/597
(58) Field of Search ................................ 209/576, 577, 209/579, 586, 597, 940; 53/53, 505, 66; 493/16

(56) References Cited

U.S. PATENT DOCUMENTS

| | | | |
|---|---|---|---|
| 3,415,369 A | * 12/1968 | Hennig | 209/88 |
| 3,678,176 A | * 7/1972 | Lampi et al. | 250/83.3 |
| 3,941,485 A | * 3/1976 | Madden | 356/159 |
| 4,053,056 A | * 10/1977 | Day | 209/73 |
| 4,453,083 A | * 6/1984 | Bohlander et al. | 250/561 |
| 5,184,190 A | * 2/1993 | Rai et al. | 356/239 |
| 5,260,766 A | * 11/1993 | Armitage | 356/237 |
| 5,673,111 A | * 9/1997 | Nyquist | 356/375 |
| 5,861,078 A | * 1/1999 | Huben et al. | 156/353 |
| 5,870,199 A | * 2/1999 | Wurbs et al. | 356/376 |
| 5,957,821 A | * 9/1999 | Scharbrodt et al. | 493/11 |
| 6,189,702 B1 | * 2/2001 | Bonnet | 209/651 |

FOREIGN PATENT DOCUMENTS

| | | |
|---|---|---|
| DE | 91 16 407.9 | 2/1993 |
| DE | 44 04 483 A1 | 8/1995 |
| DE | 195 05 509 A1 | 8/1996 |
| DE | 196 51 954 A1 | 6/1998 |
| EP | 0 332 781 A2 | 9/1989 |
| EP | 0726445 A3 * | 11/1997 |
| EP | 0847926 A1 * | 6/1998 |
| JP | 6-32233 | 2/1994 |
| JP | 10-49677 | 2/1998 |

OTHER PUBLICATIONS

Patent Abstracts of Japan, Publication No. 0603223A, Publication Date Feb. 8, 1994, Applicant: Nippon Cable Co. Ltd., Application No. 04213492, date of filing Jul. 17, 1992.

Patent Abstracts of Japan, Publication No. 10049677A, Publication Date Feb. 20, 1998, Applicant: Nippon Avionics Co. Ltd, Application No.: 08208189, date of filing Aug. 7, 1996.

* cited by examiner

Primary Examiner—Donald P. Walsh
Assistant Examiner—David A. Jones
(74) Attorney, Agent, or Firm—Norris McLaughlin & Marcus

(57) ABSTRACT

Apparatus and method for monitoring the width of the transverse sealing web of a sealed, cut package unit in which products are packaged and which is transported further in a cyclic or continuous manner in the longitudinal direction. Two laser-optical sensors are arranged opposite one another above and below the cut package units. The measured values of the sensors, the said measured values corresponding to the distance from the package unit, are acquired at a speed-proportional clock frequency. A difference value is formed from the measured values of the two sensors which have been recorded in the same clock cycle, and an output signal is generated if the number of successive difference values which exceed or fall below a predetermined reference value falls below a predetermined critical value.

11 Claims, 5 Drawing Sheets

MONITORING DEVICE FOR THE SEALING WEB WIDTH

Figure 1:
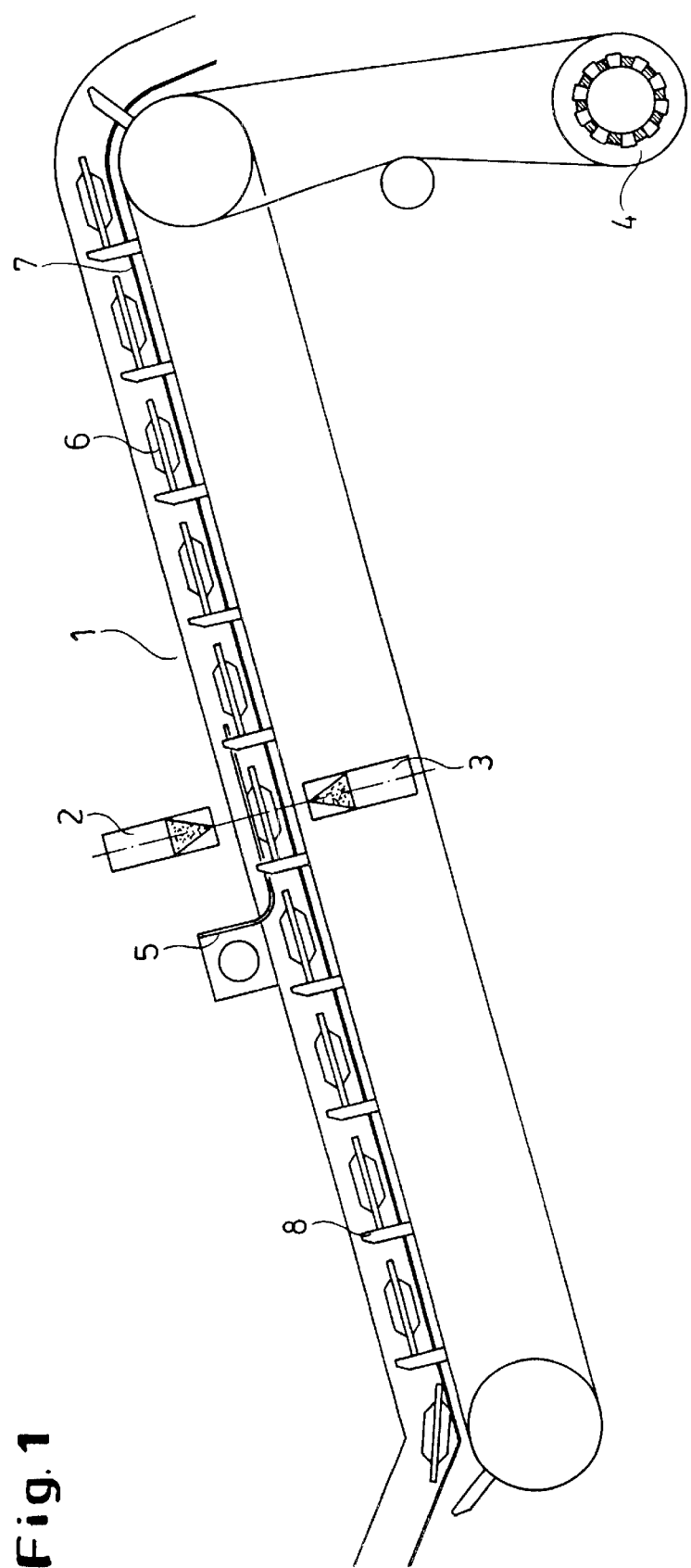

The invention relates to an apparatus and a method for monitoring the sealing web width of sealed package units in which products are packaged.

The products may be, for example, solid bodies, powders, granules, pastes or liquids. Such products are often packaged in sealed package units, in particular package units which are sealed in an airtight manner, in order to protect them from drying out or the ingress of moisture or else with regard to their sterility (contamination by micro-organisms). Typical products in the foodstuffs industry are mustard, mayonnaise or ketchup, and typical products in the pharmaceutical industry are tablets, sugar-coated tablets, skin gels or ointments.

In order to provide an understanding of the invention, packaging for moisture-pharmaceutical preparations in tablet form will be discussed by way of example below. Packaging means for moisture-sensitive pharmaceutical preparations in tablet form frequently uses foil and film which are sealed closed around the tablets. Each tablet is situated in a cell which is sealed in an airtight manner and is bounded all around on the outside by sealing seams. As a rule, a plurality of sealed tablets, for example two or four, are accommodated in one package unit in the form of a strip. Aluminum foil composites are particularly suitable as packaging material. In order to user the medicament, a strip unit with tablets is removed from the supply pack and the foil is tom open in the vicinity of a tablet, so that the tablet is available.

The sealing machine, in the production mode, provides the tablets such that they are sealed in in an airtight manner on a foil/film-type tablet carrier, in which each tablet is enclosed in a square by two longitudinal sealing webs and two transverse sealing webs. The longitudinal sealing webs are arranged parallel to the edges of the foil/film carrier and the transverse sealing webs are arranged perpendicularly thereto. During fabrication and automatic packaging, the tablet carrier is then cut off in each case in the region of a transverse sealing web, thereby producing smaller package units in strip form and each having two or four tablets, for example, which units are then packaged ready for sale in a box of 10 to 40 units.

The cutting-off apparatus that is usually employed is a rotating cutter roller, which places the separating cut as exactly as possible (±1 mm) in the centre of a transverse sealing web. However it has been shown in operational practice that the tolerances of the sealing webs in the longitudinal direction are so large that it is not possible to achieve the accuracy demanded above. The inaccuracy in the separating cut has the effect that in unfavourable cases the transverse sealing web is cut at the edge or even outside the web width and the requisite reliably tight sealing-in of the tablets is no longer ensured. In these cases, air and moisture can penetrate and the storage life of the tablets is greatly reduced.

The invention is based on the object of monitoring the width of the transverse sealing web of the cut package units, and of generating a characteristic signal in the case of defective separating cuts. This signal can then be used for automatic ejection of the corresponding package unit.

This object is achieved according to the invention by means of a method which contains the following steps:

a. measured values corresponding to the distance from the scanned surface are acquired at a clock frequency proportional to the transport speed by two laser-optical sensors which are arranged opposite one another above and below the cut package units;

b. summation values are formed from the two measured values of the two sensors, the said measured values being recorded in the same clock cycle;

c. the number of successive summation values in which a predetermined reference value is exceeded or undershot is determined;

d. an output signal is generated if the number of summation values determined in c. falls below a predetermined critical value.

If a tablet strip is situated between the two sensors at the measurement instant, then the sum of the measured values of the two sensors (summation value) corresponds to the thickness of the tablet strip.

In the region of the gap between two package units, the laser-optical sensors measure distances from surfaces that are very far away. In comparison, the distances from these surfaces that are very far away differ by several orders of magnitude from the distances from a package unit passing through. To ensure that the uncontrolled large measured values of the sensors resulting from the distances from the remote surfaces are not processed further, these measured values in each sensor can be set to a predetermined, constant measured value.

The clock frequency may be generated by a clock frequency generator coupled to the drive shaft of the conveying device which transports the package units in strip form in a cyclic or continuous manner.

The laser-optical sensors are preferably colour-independent.

According to a preferred embodiment of the invention, the output signal triggers ejection of the corresponding package unit.

Furthermore, the invention relates to an apparatus for carrying out the method according to the invention. This apparatus comprises two laser-optical sensors, which are arranged opposite one another above and below the cut package units and whose measured values are acquired at a speed-proportional clock frequency, a clock frequency generator, which prescribes the clock frequency for acquiring the measured values, a matching unit, which forms the summation value from the two measured values of the sensors, the said measured values being measured in the same clock cycle, and the evaluation unit, which determines the number of summation values which lie above or below a reference value and generates an output signal if the number of summation values falls below a predetermined critical value.

The clock frequency generator is preferably coupled to the drive shaft of the conveying device which transports the package units in strip form in such a way that it generates a speed-proportional clock frequency.

In a preferred embodiment of the apparatus according to the invention, the sensors produce analogue measured values from which an analogue summation value results and the matching unit matches the analogue summation value to an analogue-to-digital converter (ADC) and generates a digital summation value which is processed further in the evaluation unit.

The measured values of the sensors which are characteristic of the region of the gap between two package units preferably assume a predetermined, constant quantity.

A holding-down device preferably fixes the cut package units on their support in the region of the laser-optical sensors.

In a preferred embodiment of the invention, an ejection unit is arranged downstream of the laser-optical sensors in the conveying direction, which ejection unit ejects the corresponding package unit when an output signal from the evaluation unit is received.

The following advantages are obtained with the invention:

Packaging with cutting errors can be identified automatically and reliably. It is possible to prevent such defective packaging units from being packed any further.

By precluding this source of defects, the requisite product storage life can be reliably adhered to. Subsequent checking that is otherwise necessary can be obviated.

FIGURES AND EXAMPLES

Figure 2:
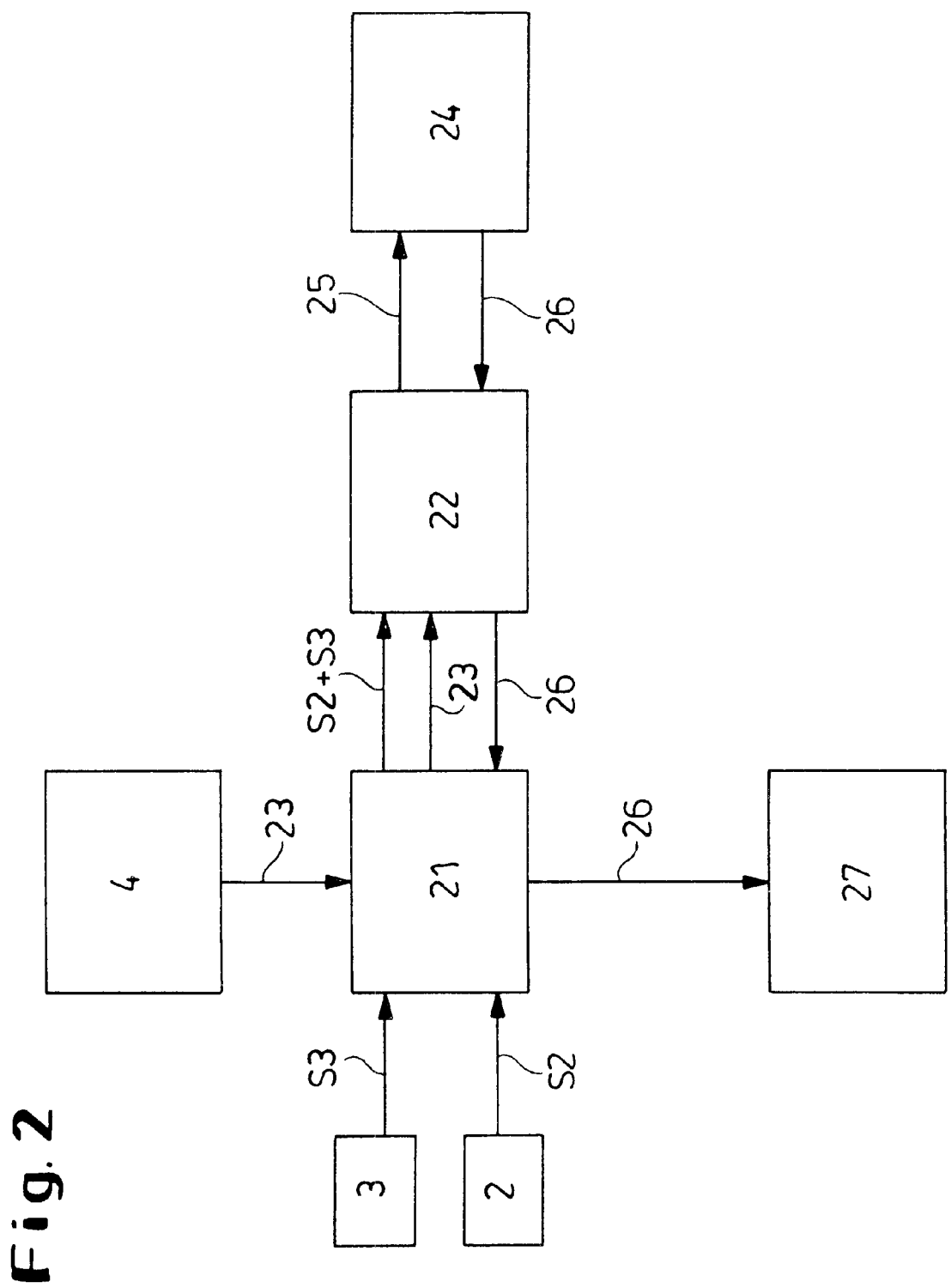
Figure 3:
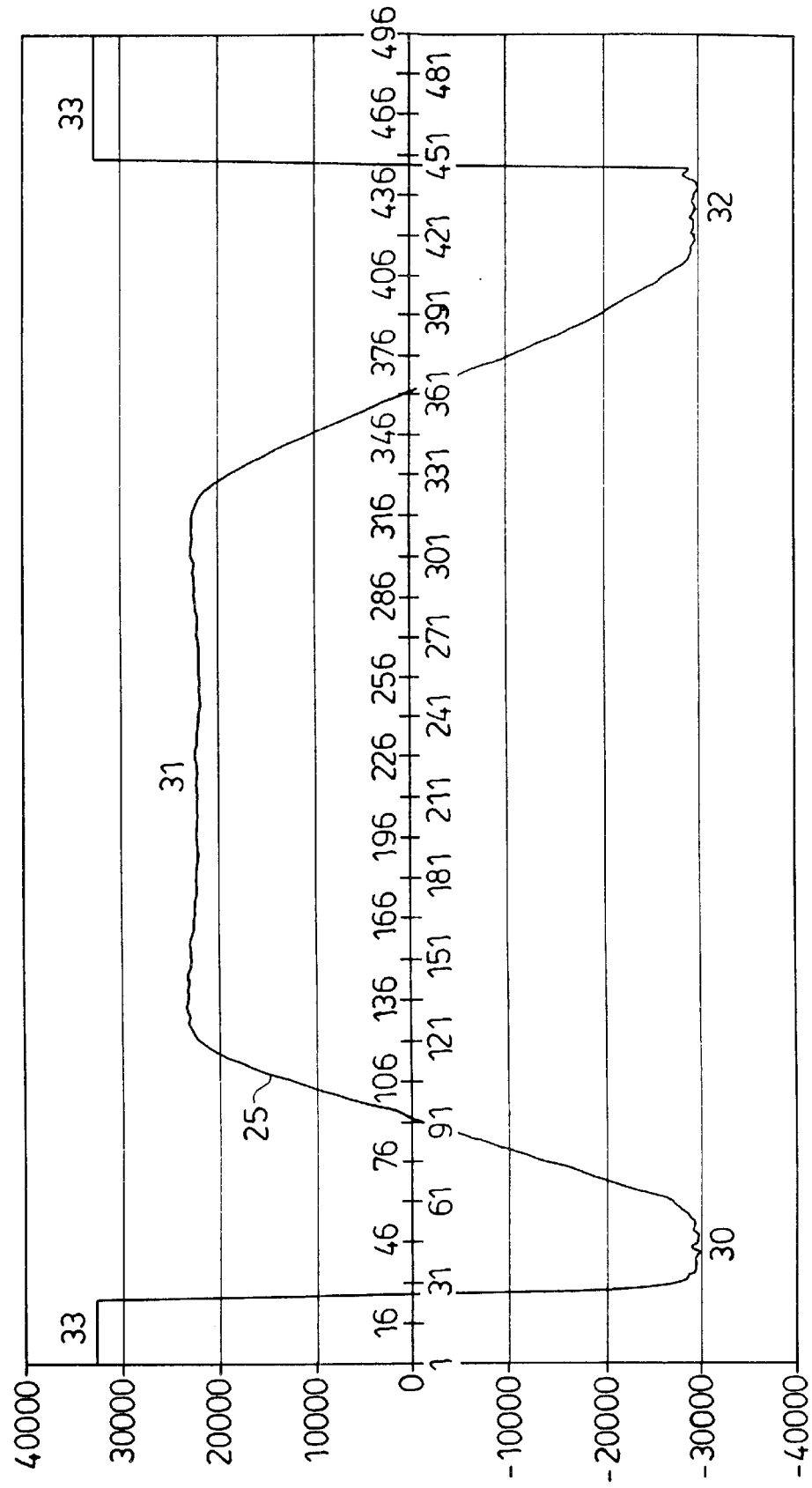
Figure 4:
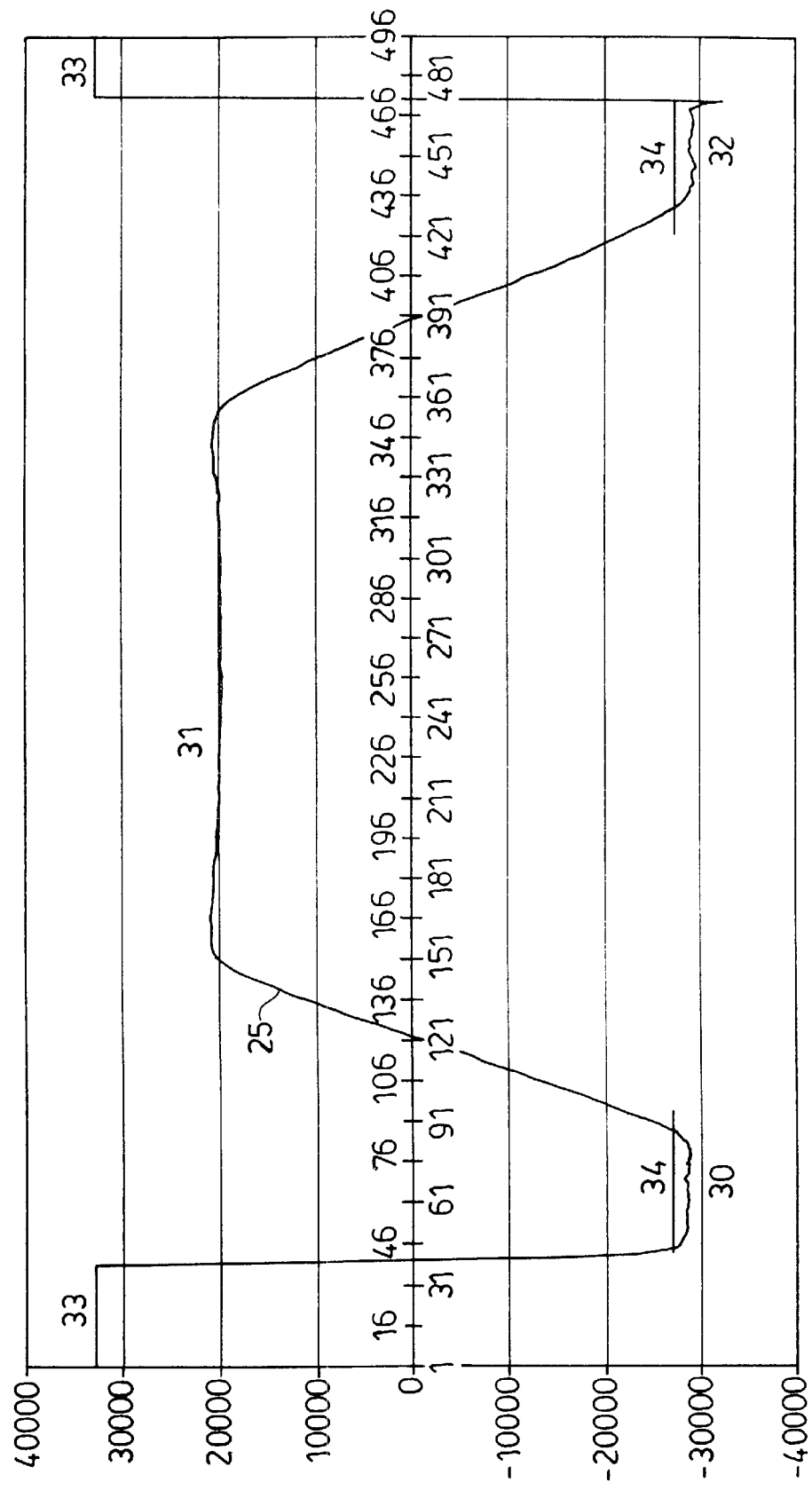
Figure 5:
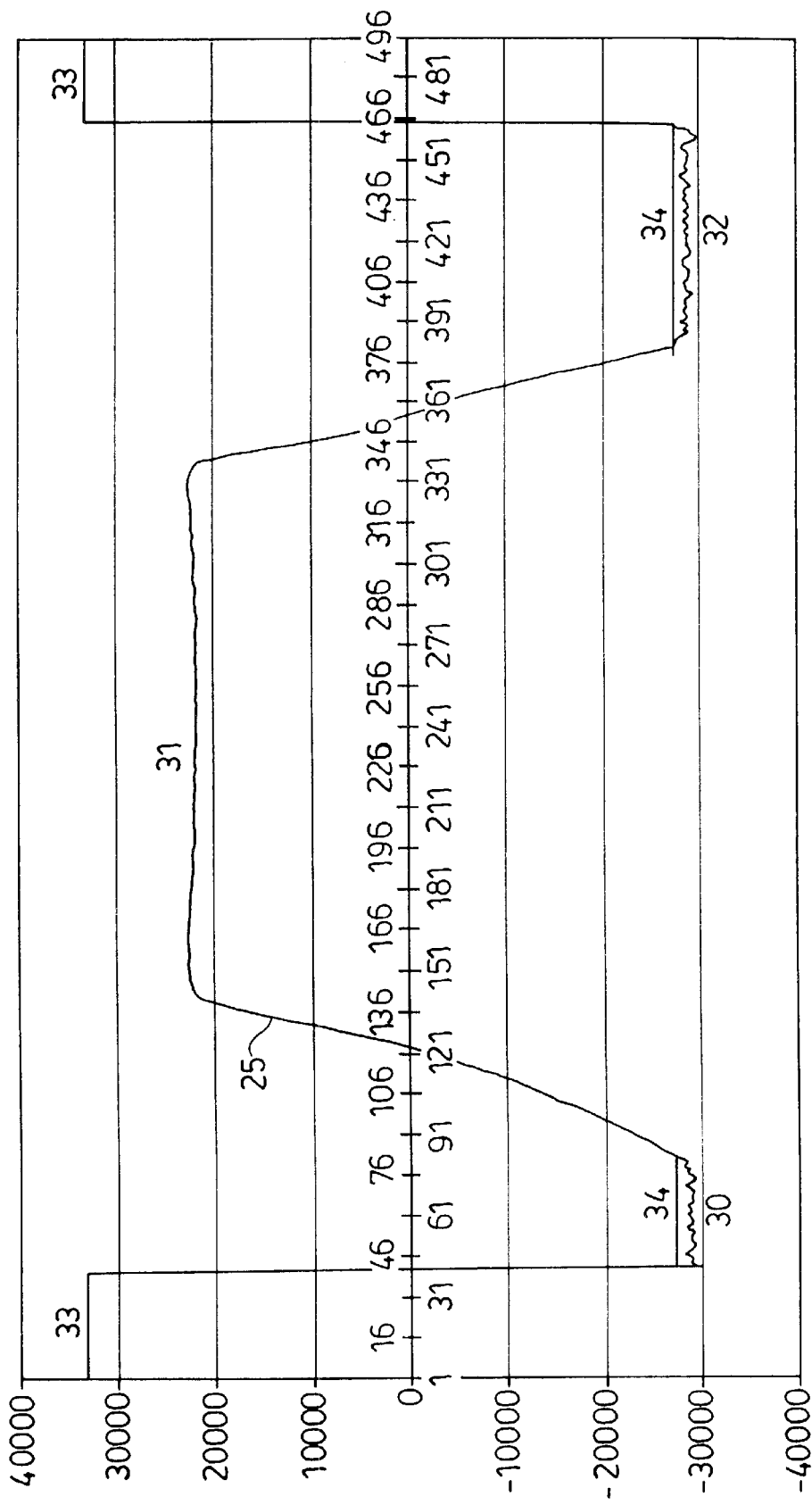

The invention is explained in more detail below with reference to an exemplary embodiment and drawings, in which FIG. 1 shows an apparatus for monitoring the width of the transverse sealing web, FIG. 2 shows a circuit for generating the output signal, FIG. 3 shows the measurement of the sealing web width, FIG. 4 shows the summation value profile for approximately identical sealing web widths, and FIG. 5 shows the summation value profile for non-identical sealing web widths.

The apparatus for monitoring the width of the transverse sealing web is installed on a conveying device 1, which continuously transports the package units 6 in strip form (FIG. 1). In this case, the package units 6 lie on angular transporting rails 7 and are pushed forwards by vertical transporting fingers 8. There is a gap of about 110 mm between two package units. The laser-optical sensors 2 and 3 are arranged opposite one another with the beam direction perpendicular to the conveying direction above (sensor 2) and below (sensor 3) the conveying device 1. They measure the distance from one of the package units 6 and generate a voltage signal corresponding to the distance. If a packaging unit is not situated between the sensors 2 and 3, then a predetermined measured value of −5 V is output by each sensor. The sensors 2 and 3 are read at a clock frequency proportional to the transport speed. The clock frequency is prescribed by the clock frequency generator 4 coupled to the drive shaft of the conveying device 1.

The measured values of the sensors 2 and 3 are processed further in accordance with the evaluation circuit in FIG. 2. Both sensors are connected to a matching unit 21. In the matching unit 21, the analogue summation value S2+S3 is formed from the two analogue measured values S2, S3 of the sensors and is matched to the analogue input voltage range of an analogueo-digital converter 22. The conversion of the analogue summation S2+S3 into a digital value 25 takes place in the analogue-to-digital converter (ADC) 22. In order to ensure equidistant-length sampling in the measurements of the sensors 2, 3 the conversion of the analogue S2+S3 into the digital 25 summation value in the ADC 22 takes place at a clock frequency 23 which is generated by a clock frequency generator 4 coupled to the drive shaft of the conveying device 1. In the evaluation units 24, the digital summation values 25 are compared with the predetermined reference value 34 (FIG. 4) and the number of summation values 25 which lie below the predetermined reference value 34 is determined. If the number of summation values 25 thus determined lies below a critical value, then the evaluation unit 24 generates the output signal 26, which controls an ejection unit 27 via the ADC 22 and the matching unit 21.

FIG. 3 shows a typical profile of the summation values 25 for a tablet strip that are present in the evaluation unit 24. In this case, the interval between two values is not a constant time interval but rather the interval of two clock cycles of the clock-frequency generator 4. The summation values 25 are plotted against the clock values. In the region of the front sealing web 30, the summation value has negative values for about 60 clock cycles, and then rises to positive values in the region of the packaged product 31, and reaches summation values in the negative range again for about 90 clock cycles in the region of the rear sealing web 32. In the gap 33 between the tablet strips, the summation value has a predetermipned positive value.

FIG. 4 and FIG. 5 show, in comparison, the profile of a measurement curve for approximately identical sealing web widths and for non-identical sealing web widths. The basic profile of the measurement curves is that described in FIG. 3, with the regions of gap 33, front sealing web 30, packaged product 31 and rear sealing web 32. The reference value 34 is depicted in the region of the measurement curve corresponding to the sealing webs 30 and 32. The number of clock cycles for which the measurement curve lies below the reference value 34 is determined and compared with a critical value defined beforehand. If the number of clock cycles with summation values 25 below the reference value 34 lies below a defined critical value, then this means that the sealing web width is too narrow and, as a consequence, the corresponding packaging unit is ejected, triggered by a corresponding output signal 26. In FIG. 4, the number of clock cycles with summation values 25 below the reference value 34 has approximately the same magnitude, at about 50, for both sealing webs; in FIG. 5, the number of clock cycles with summation values 25 below the reference value 34 is distinctly smaller in the case of the front sealing web 30, at about 50, than in the case of the rear sealing web 32, at about 90.

What is claimed is:

1. Method for monitoring the width of the transverse sealing web of a sealed, cut package unit in which products are packaged and which is transported further in a cyclic or continuous manner in the longitudinal direction, wherein
    a) Measured values corresponding to the distance from a scanned surface are acquired at a speed-proportional clock frequency by two laser-optical sensors which are arranged opposite one another above and below the cut package units;
    b) Summation values are formed from the two measured values of the two sensors, the said measured values being recorded in the same clock cycle;
    c) The number of successive summation values in which a predetermined reference value is exceeded or undershot is determined;
    d) An output signal is generated if the number of summation values determined in c. falls below a predetermined critical value.

2. Method according to claim 1, wherein the clock frequency is generated by a clock frequency generator coupled to the drive shaft of the conveying device for the package units.

3. Method according to claim 1 wherein the measured values of the laser-optical sensors have a predetermined, constant value when the gap between two package units is scanned.

4. Method according to claim 1, wherein the output signal triggers the ejection of the corresponding package unit.

5. Apparatus for monitoring the width of the transverse sealing web of a sealed, cut package unit in which products are packaged and which is transported further in a cyclic or continuous manner in the longitudinal direction and generating an output signal if the width of said transverse sealing web falls below a predetermined value, comprising two laser-optical sensors, which are arranged opposite one another above and below cut package units and whose measured values are acquired at a speed-proportional clock frequency, a clock frequency generator, which prescribes the clock frequency for acquiring the measured values, a matching unit, which forms the summation value from the two measured values of the sensors, the said measured values being measured in the same clock cycle, and an evaluation unit, which determines the number of summation values which lie above or below a reference value and generates an output signal if the number of summation values falls below a predetermined critical value.

6. Apparatus according to claim 5, wherein an analogue-to-digital converter is connected between the matching unit and the evaluation unit, the summation value being fed in analogue form into the said analogue-to-digital converter and the latter forwarding the summation value in digital form to the evaluation unit.

7. Apparatus according to claim 5 wherein the clock frequency generator is coupled to the drive shaft of the conveying device in such a way that it generates a speed-proportional clock frequency.

8. Apparatus according to claim 5, wherein laser-optical sensors whose measured values are color-independent are used.

9. Apparatus according to claim 5, wherein a holding-down device fixes the cut package units on their support in the region of the laser-optical sensors.

10. Apparatus according to claim 5, wherein the signals of the sensors which are characteristic of the region of the gap between two package units have a constant value in each case.

11. Apparatus according to claim 5, wherein an ejection unit is arranged downstream of the laser-optical sensors in the conveying direction, which ejection unit ejects the corresponding package unit when an output signal from the evaluation unit is received.

* * * * *